United States Patent
Jeske et al.

(10) Patent No.: US 7,453,933 B2
(45) Date of Patent: Nov. 18, 2008

(54) METHOD OF ESTIMATING A SIGNAL-TO-INTERFERENCE+NOISE RATIO (SINR) USING DATA SAMPLES

(75) Inventors: Daniel R. Jeske, Monmouth, NJ (US); Pantelis Monogioudis, Randolph, NJ (US); Kiran M. Rege, Monmouth, NJ (US); Ashwin Sampath, Somerset, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 1480 days.

(21) Appl. No.: 09/848,259

(22) Filed: May 4, 2001

(65) Prior Publication Data
US 2002/0176516 A1 Nov. 28, 2002

(51) Int. Cl.
*H04B 3/46* (2006.01)
*H04B 17/00* (2006.01)
*H04Q 1/20* (2006.01)

(52) U.S. Cl. ...................... 375/227; 375/324
(58) Field of Classification Search ............ 375/316, 375/100, 200, 324, 130–150, 147, 227, 340, 375/322
See application file for complete search history.

(56) References Cited

U.S. PATENT DOCUMENTS

| | | | | |
|---|---|---|---|---|
| 4,627,103 A * | 12/1986 | Fukuhara | ............. | 455/226.3 |
| 4,774,518 A * | 9/1988 | Fukuhara | ............. | 342/389 |
| 5,025,455 A * | 6/1991 | Nguyen | ............. | 375/327 |
| 5,576,715 A * | 11/1996 | Litton et al. | ............. | 342/357.12 |
| 5,825,807 A * | 10/1998 | Kumar | ............. | 375/130 |
| 5,862,186 A * | 1/1999 | Kumar | ............. | 375/324 |
| 5,878,085 A * | 3/1999 | McCallister et al. | ............. | 375/280 |
| 5,903,554 A * | 5/1999 | Saints | ............. | 370/342 |
| 6,125,135 A * | 9/2000 | Woo et al. | ............. | 375/130 |
| 6,160,841 A * | 12/2000 | Stansell et al. | ............. | 375/148 |
| 6,302,576 B1 * | 10/2001 | Ono et al. | ............. | 714/794 |
| 6,389,079 B2 * | 5/2002 | Raheli et al. | ............. | 375/262 |
| 2002/0064218 A1* | 5/2002 | Willes et al. | ............. | 375/219 |
| 2006/0117127 A1* | 6/2006 | Milan et al. | ............. | 710/313 |

OTHER PUBLICATIONS

A. Furuskär et al., "EDGE: Enhanced Data Rates for GSM and TDMA/136 Evolution," IEEE *Personal Communications Magazine*, pp. 56-66, Jun. 1999.

C.E. Gilchriest, "Signal-to-Noise Monitoring," *JPL Space Programs Summary*, vol. IV, No. 32-37, pp. 169-184, Jun. 1966.

J.W. Layland, "On S/N Estimation," *JPL Space Programs Summary*, vol. III, No. 37-48, pp. 209-212, 1967.

D.R. Pauluzzi and N.C. Beaulieu, "A Comparison of SNR Estimation Techniques in the AWGN Channel," *Proceedings of IEEE Pacific Rim Conference on Communications, Computers and Signal Processing*, pp. 36-39, 1995.

(Continued)

*Primary Examiner*—Chieh M. Fan
*Assistant Examiner*—Freshteh N Aghdam

(57) ABSTRACT

In the method of estimating a signal-to-interference+noise ratio (SINR), either the polarities or bit values of a plurality of received data symbol samples are estimated. Then an SINR estimate is generated based on the plurality of received data symbol samples and the estimated polarities or bit values of the plurality of received data symbol samples such that the SINR estimate is not substantially dependent on the polarities or a bit value of the plurality of received data symbol samples.

3 Claims, 2 Drawing Sheets

OTHER PUBLICATIONS

A.L. Rukhin, "Estimating the Noncentrality Parameter of A t-Distribution," *Systems Science and Mathematical Sciences*, vol. 5, No. 1, pp. 1-8, 1992.

K. Higuchi et al., "Experimental Evaluation of Combined Effect of Coherent Rake Combining and SIR-Based Fast Transmit Power Control for Reverse Link of DS-CDMA Mobile Radio," *IEEE Journal on Selected Areas in Comm.*, vol. 18, No. 8, pp. 1526-1535.

M.L. Tiku, "Doubly Noncentral F-Distributions—Tables and Applications," *Selected Tables in Mathematical Statistics*, vol. 2, pp. 139-149.

F.E. Satterthwaite, "An Approximate Distribution of Estimates of Variance Components," *Biometrika Bulletin*, vol. 2, pp. 110-114, 1946.

M.D. Austin and G.L. Stüber, "In-Service Signal Quality Estimation for TDMA Cellular Systems," *Proceedings of the Personal Indoor Mobile Radio Conference (PIMRC)*, pp. 836-840, Sep. 1995.

M. Andersin et al., "Subspace Based Estimation of the Signal to Interference Ratio for TDMA Cellular Systems," *Proceedings of the Vehicular Technology Conference (VTC)*, pp. 1155-1159, May 1996.

* cited by examiner

METHOD OF ESTIMATING A SIGNAL-TO-INTERFERENCE+NOISE RATIO (SINR) USING DATA SAMPLES

BACKGROUND OF THE INVENTION

1. Field of the Invention

The present invention relates to wireless communication, and more particularly, a method of estimating a signal-to-interference+noise ratio.

2. Description of Related Art

Signal-to-Interference+Noise Ratio (SINR) is an important metric of communication link quality. SINR estimation is of particular importance for wireless data systems where resources are shared dynamically amongst users. Some applications of SINR estimates are: a) Power Control in CDMA Systems: the receiver estimates the SINR, compares it to a target and commands the transmitter to increase/decrease its transmitted power; and b) Rate Adaptation: the information bit-rate assigned to a user can be dynamically varied based on its link quality and the system load. While such adaptation has limited use in voice systems, it is extremely useful for wireless data systems. Consequently, inaccurate SINR estimates can severely degrade performance and resource utilization.

SUMMARY OF THE INVENTION

In the method according the present invention, data symbol samples are converted into quasi-pilot symbol samples. The conversion essentially eliminates a dependence on the polarity or bit value of the data symbol samples. Then any well-known SINR estimator is applied to the quasi-pilot symbol samples to obtain an SINR estimate.

BRIEF DESCRIPTION OF THE DRAWINGS

The present invention will become more fully understood from the detailed description given herein below and the accompanying drawings, which are given by way of illustration only, and thus are not limitative of the present invention, and wherein.

DETAILED DESCRIPTION OF THE PREFERRED EMBODIMENTS

Figure 1:
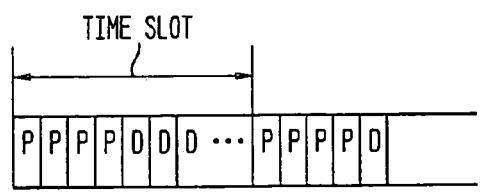
FIG. 1 illustrates pilot and data symbols multiplexed in a time slot.

In describing the method of estimating the signal-to-interference+noise ratio according to the present invention, only Binary Phase Shift Keying (BPSK) modulation is considered although the methods and related analysis can be extended to other signaling schemes. Noise and interference are modeled together as additive white Gaussian noise (AWGN), but as will be appreciated from the following disclosure, this should not limit the application of the method according to the present invention. Transmission is organized into fixed duration timeslots, each containing pilot and data symbols as shown in FIG. 1. The channel attenuation and phase shift, assumed fixed over a timeslot, are treated as unknown constants rather than as random variables (no fading assumption).

First, to better understand the method according to the present invention, the conventional SINR estimation will be described. Typically, the received signal corresponding to the jth transmitted symbol (pilot or data) in the kth time slot is defined as $$Y_{kj} = \alpha_{kj}\mu_k + \epsilon_{kj}, j=1,2,\ldots,N, \quad (1)$$

where $\mu_k$ represents the received signal amplitude (product of transmitted amplitude and channel gain), $\epsilon_{kj}$ is a random variable that represents the noise+interference, $\alpha_{kj}$ represents the symbol-value, and N is the number of samples (pilot or data). Information symbols could be +1 or −1 (in BPSK), while it is assumed (without any loss of generality) that pilot symbols are always +1. It is also assumed that the distribution that characterizes the noise+interference is Gaussian with zero mean and variance $\sigma^2$. The SINR in the kth time slot is defined as:

$$\Theta_k = \frac{\mu_k^2}{\sigma^2} \quad (2)$$

and is the parameter to be estimated.

The groups of N sample points (data or pilot) could correspond to a time slot in CDMA systems or frames in TDMA systems. A well-known pilot-symbol sample based estimator of SINR is computed as the ratio of the square of the sample mean of the received pilot-symbol sample Y (based on N sample points in a group) to the corresponding sample variance. Estimators based on this ratio are called Squared Mean By Variance or SMV estimators. Different SMV estimators have been studied in the literature and they only differ in the normalization constant used to compute the sample variance.

$$\overline{Y}_k = \frac{1}{N}\sum_{j=1}^{N} Y_{kj} \quad (3)$$

$$S_k^2 = \frac{1}{N-1}\sum_{j=1}^{N}(Y_{kj}-\overline{Y}_k)^2. \quad (4)$$

For the case where the $\{Y_{kj}\}$ values correspond to pilot symbols, define the sample mean and unbiased sample variance for the kth time slot as Then, $\hat{\Theta}_k = (\overline{Y}_k)^2/S_k^2$ is one possible SMV estimator (commonly used). The Maximum Likelihood (ML) estimator of the SINR is also an SMV estimator where a biased sample variance estimate is used in the ratio (normalization is by N rather than N−). The signal power, $\mu_k^2$, varies due to channel fading. However, the noise variance, $\sigma^2$, changes very slowly with time, typically with the addition (departure) of a call; therefore, one can improve the overall quality of the SINR estimate by using a longer-term moving average estimate of the sample variance. This makes the "effective" number of samples used in the sample variance estimate larger and therefore more accurate. One simple method to accomplish this is through exponential smoothing of a set of sample variance estimates (called Exponentially Weighted Moving Average or EWMA). The smoothed sample variance estimate through the kth time slot would be given by:

$$\hat{\sigma}_k^2 = (1-r)\hat{\sigma}_{k-1}^2 + rS_k^2, k \geq 1, \quad (5)$$

where r is the smoothing factor determined according to desired design parameters and $0 < r \leq 1$. The SINR estimate at the end of k time slots then becomes:

$$\hat{\Theta}_k = \frac{(\overline{Y}_k)^2}{\hat{\sigma}_k^2}. \quad (6)$$

The accuracy (mean and variance) of SMV estimators based on using a single group of pilots with N sample points is known in the art. The accuracy of SMV estimators that utilize EWMA for sample variance estimation is described in the concurrently filed application no. UNKNOWN entitled METHOD OF ESTIMATING A SIGNAL-TO-INTERFERENCE+NOISE RATIO (SINR).

Typically, there are a lot more data symbols than pilot symbols and one could potentially reduce the mean-squared error in the SINR estimate by using data symbols instead of pilot symbols. The difficulty with extending the estimator form from the pilot-based estimator is that the data symbol polarity is not known. A commonly used SMV estimator, called the non-coherent estimator, attempts to overcome this problem by replacing the sequence $\{Y_{kj}\}$ by the sequence of its absolute values i.e. $\{Z_{kj} = |Y_{kj}|\}$. The SINR estimate for the kth time slot is the ratio of the sample mean and sample variance of the sequence $\{Z_{kj}\}$. Smoothing of the sample variance of the $\{Z_{kj}\}$ sequence via the EWMA approach may also be used to improve accuracy. This approach works well only when the SINR being estimated is quite large. For small to moderate SINR values, the estimates have a large mean squared error because the absolute value transformation causes a large bias in the estimates.

The approach described in this invention, henceforth called the decision-feedback estimation method, mitigates the need for the absolute value transformation by converting the data symbols into quasi-pilot symbols. The quasi-pilot symbols are essentially independent of the (unknown) data symbol polarities.

Figure 2:
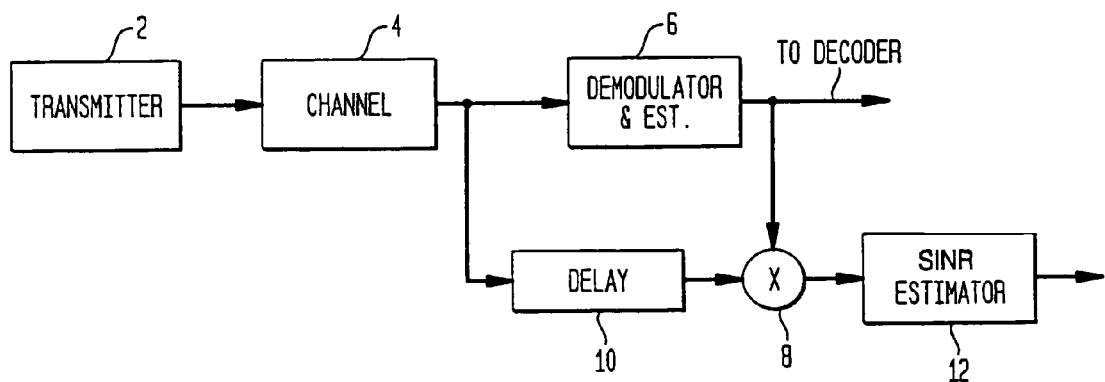
FIG. 2 illustrates a block diagram of a SINR estimator according to an embodiment of the present invention.

FIG. 2 illustrates a block diagram of a decision-feedback SINR estimator according to an embodiment of the present invention. As shown, a demodulator and estimator 6 receives a signal transmitted by a transmitter 2 over a channel 4 (e.g., a wireless transmission over the air). The demodulator and estimator 6 demodulates and stores a set of received samples $Y_{kj}$. The demodulator and estimator 6 stores the received samples $Y_{kj}$ until the estimator portion makes a tentative estimate $\hat{\alpha}_{kj}$ on the polarity (or bit value) $\alpha_{kj}$ of the received sample.

As shown in FIG. 2, an SINR estimator 12 estimates the SINR using the output of the multiplier 8. The output of the multiplier 8 may be the quasi-pilot symbol samples. The SINR estimator 12 can employ any well-known SINR estimator that generates an SINR estimate based on pilot symbols. In example embodiments of the present invention, the pilot symbols in the SINR estimator expressions are replaced with the output, the quasi-pilot symbol samples, of the multiplier 8. For example, the SINR estimator 12 could employ the SINR estimator of equation (6). In a preferred embodiment, the SINR estimator 12 employs an SINR estimator as described in concurrently filed application No. 09/848,411 entitled METHOD OF ESTIMATING A SIGNAL-TO-INTERFERENCE+NOISE RATIO (SINR) by inventors of the subject application.

The input to the SINR estimator 12 (i.e., the output of the multiplier 8) in FIG. 2 is the sequence $\{D_{kj}\}$, where $$D_{kj} = \hat{\alpha}_{kj} \alpha_{kj} \mu_k + \hat{\alpha}_{kj} \epsilon_{kj}.$$

Since the Gaussian distribution with zero mean is invariant to multiplication by +1 or −1, the distribution and statistics of the noise sequence $\{\hat{\alpha}_{kj} \epsilon_{kj}\}$ are identical to that of $\{\epsilon_{kj}\}$. Therefore, one can equivalently rewrite $$D_{kj} = \hat{\epsilon}_{kj} \epsilon_{kj} \mu_k + \epsilon_{kj}.$$

Whenever the decisions are correct, $\hat{\alpha}_{kj} = \alpha_{kj}$ and (since $\alpha_{kj} = 1$ or −1) the result is $$D_{kj} = \mu_k + \epsilon_{kj}.$$

Thus, when the decisions are correct, the sequence of $D_{kj}$ values is equivalent to a sequence of $Y_{kj}$ values with all $\alpha_{kj} = 1$ (as would be the case with pilot symbols). Therefore, one can obtain an SMV estimator of SINR based on the sample mean and sample variance of $D_{kj}$ values such as equation (6) or as described in concurrently filed application no. UNKNOWN entitled METHOD OF ESTIMATING A SIGNAL-TO-INTERFERENCE +NOISE RATIO (SINR) by inventors of the subject application. Similarly, whenever incorrect decisions are made we have $$D_{kj} = -\mu_k + \epsilon_{kj}.$$

Therefore, if the fraction of incorrect decisions is large, an SMV estimator of the SINR based on $D_{kj}$ values would tend to be quite inaccurate because the sample mean of the $D_{kj}$ values would not be estimating $\mu_k$. However, for typical operating SINR values, many more correct decisions are made as compared to incorrect ones (better than 90% typically) and the performance of SMV estimators is very good. In the best case, when all the decisions are correct, the performance of the SMV estimator based on the $D_{kj}$ values will be identical to a pilot-sample based SMV estimator that has the same sample size.

Figure 3:
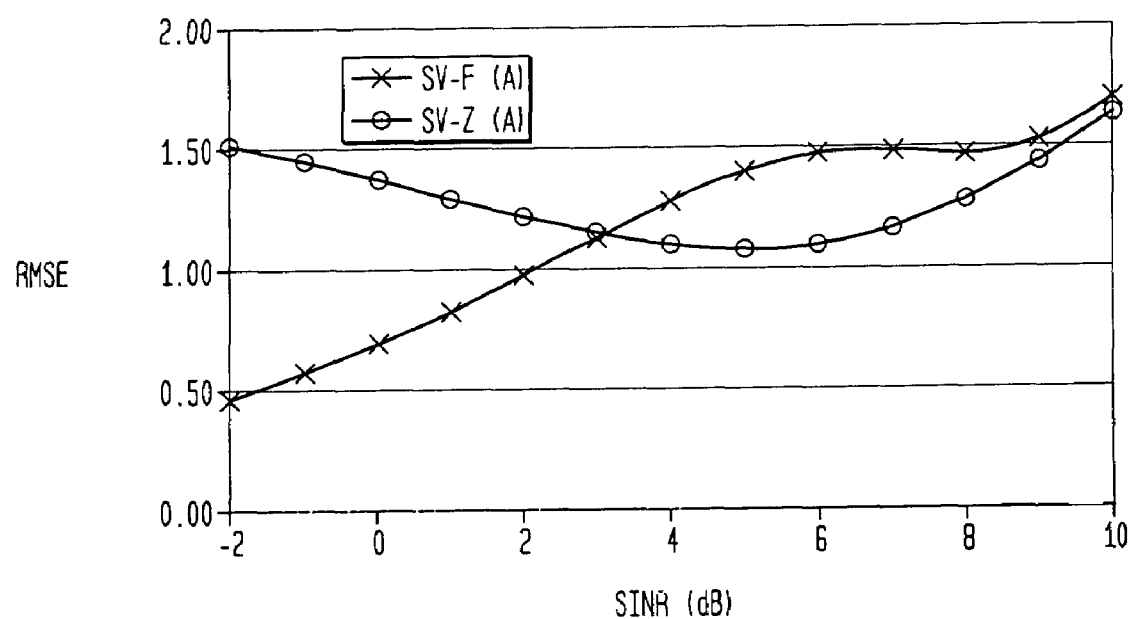
FIG. 3 illustrates the performance of the smoothed non-coherent SINR estimator and the smoothed decision-feedback SINR estimator.

An illustration of the improved accuracy of the decision-feedback method according to the present invention is shown in FIG. 3. The figure compares the smoothed non-coherent SINR estimator with the smoothed decision-feedback SINR estimator. In the figure SV-Z stands for smoothed non-coherent SINR estimator and SV-F stands for smoothed decision-feedback SINR estimator.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A method of estimating a signal-to-interference+noise ratio (SINR), comprising:
    estimating polarities of a plurality of received data symbol samples;
    converting the received plurality of data symbol samples into plurality of quasi-pilot symbol samples based on the estimated polarities by multiplying each of the plurality of received data symbol sample by an associated estimated polarity; and
    generating an SINR estimate based on the plurality of quasi-pilot symbol samples using the multiplication results as the plurality of quasi-pilot symbol samples in an SINR estimation algorithm such that the SLNR estimate is not dependent only on the polarities of the plurality of received data symbol samples.

2. A method of estimating a signal-to-interference+noise ratio (SINR), comprising:

estimating bit values of a plurality of received data symbol samples;

converting the received plurality of data symbol samples into plurality of quasi-pilot symbol samples based on the estimated polarities by multiplying each of the plurality of received data symbol sample by an associated estimated polarity; and generating an SINR estimate based on the plurality of quasi-pilot symbol samples using the multiplication results as the plurality of quasi-pilot symbol samples in an SINR estimation algorithm such that the SINR estimate is not dependent only on a bit value of the plurality of received data symbol samples.

3. A method of estimating a signal-to-interference+noise ratio (SINR), comprising:

estimating polarities of a plurality of received data symbol samples; converting the received data symbol samples into quasi-pilot symbol samples based on the estimated polarities by multiplying each of the plurality of received data symbol sample by an associated estimated polarity; and generating an SINR estimate based on the quasi-pilot symbol samples using the multiplication results as the plurality of quasi-pilot symbol samples in an SINR estimation algorithm.

* * * * *